(12) United States Patent
Miyamura et al.

(10) Patent No.: US 6,591,214 B2
(45) Date of Patent: Jul. 8, 2003

(54) COMMUNICATION INTERFACE UNIT, CONNECTION TOOL FOR TEST, WRAP TEST TOOL, AND WRAP TESTING METHOD

(75) Inventors: Tsuyoshi Miyamura, Yokohama (JP); Tomoaki Kimura, Fujisawa (JP)

(73) Assignee: International Business Machines Corporation, Armonk, NY (US)

(*) Notice: Subject to any disclaimer, the term of this patent is extended or adjusted under 35 U.S.C. 154(b) by 161 days.

(21) Appl. No.: 09/772,135

(22) Filed: Jan. 29, 2001

(65) Prior Publication Data

US 2002/0052704 A1 May 2, 2002

(30) Foreign Application Priority Data

Feb. 1, 2000 (JP) ......................................... 2000-024272

(51) Int. Cl.[7] ................................................. G06F 3/00
(52) U.S. Cl. ....................... 702/120; 702/116; 702/117; 702/118; 702/119; 702/121; 702/122
(58) Field of Search ......................... 702/116–122, 183, 702/186, 189; 705/36, 43; 382/550

(56) References Cited

U.S. PATENT DOCUMENTS 5,337,250 A * 8/1994 Sidiski ......................... 364/481
5,691,871 A * 11/1997 Innes ........................... 361/96
6,002,868 A * 12/1999 Jenkins et al. ............... 395/701
6,449,660 B1 * 9/2002 Berg et al. ..................... 710/1

* cited by examiner

Primary Examiner—Marc S. Hoff
Assistant Examiner—Felix Suarez
(74) Attorney, Agent, or Firm—Derek S. Jennings; Anne V. Dougherty (57) ABSTRACT

A wrap test for a communication interface unit used for a computer, etc. When a wrap tool 40 is connected to a SCSI device 10, a signal (TEMPWR) is output from an output device 38 to SCSI connectors 22 and 24 through a Y-type cable 14, then wrapped in the wrap tool 40 and returned to a SCSI controller 12 through resistors 28 and 30 as a signal (PSCSIWRAP) to recognize the wrap tool 40. Because the non-grounded end of a resistor 26 is connected to an input terminal of the SCSI controller 12, the resistors 28 and 30 are connected in parallel. The potential of the signal (PSCSIWRAP) is stabilized by the resistors 26, 28 and 30. If a single wrap tool is connected to the SCSI device 10, the potential of the signal (PSCSIWRAP) is stabilized by the resistors 26 and 28 or 30.

8 Claims, 7 Drawing Sheets

| | | | | |
|---|---|---|---|---|
| 1 | + DATA<12> | | 35 | - DATA<12> |
| 2 | + DATA<13> | | 36 | - DATA<13> |
| 3 | + DATA<14> | | 37 | - DATA<14> |
| 4 | + DATA<15> | | 38 | - DATA<15> |
| 5 | + DATA PARITY HIGH | | 39 | - DATA PARITY HIGH |
| 6 | + DATA<0> | | 40 | - DATA<0> |
| 7 | + DATA<1> | | 41 | - DATA<1> |
| 8 | + DATA<2> | | 42 | - DATA<2> |
| 9 | + DATA<3> | | 43 | - DATA<3> |
| 10 | + DATA<4> | | 44 | - DATA<4> |
| 11 | + DATA<5> | | 45 | - DATA<5> |
| 12 | + DATA<6> | | 46 | - DATA<6> |
| 13 | + DATA<7> | | 47 | - DATA<7> |
| 14 | + DATA PARITY LOW | | 48 | - DATA PARITY LOW |
| 15 | GND | | 49 | GND |
| 16 | NSCSIDIFS | | 50 | GND |
| 17 | TEMPWR | | 51 | TEMPWR |
| 18 | TEMPWR | | 52 | TEMPWR |
| 19 | NC | | 53 | PSCSIWRAP |
| 20 | GND | | 54 | GND |
| 21 | PATTENTION | | 55 | NATTENTION |
| 22 | GND | | 56 | GND |
| 23 | PBUSY | | 57 | NBUSY |
| 24 | PACKNOWLEDGE | | 58 | NACKNOWLEDGE |
| 25 | PRESET | | 59 | NRESET |
| 26 | PMESSAGE | | 60 | NMESSAGE |
| 27 | PSELECT | | 61 | NSELECT |
| 28 | PCONTROL/DATA | | 62 | NCONTROL/DATA |
| 29 | PREQUEST | | 63 | NREQUEST |
| 30 | PINPUT/POUTPUT | | 64 | INPUT/OUTPUT |
| 31 | + DATA<8> | | 65 | - DATA<8> |
| 32 | + DATA<9> | | 66 | - DATA<9> |
| 33 | + DATA<10> | | 67 | - DATA<10> |
| 34 | + DATA<11> | | 68 | - DATA<11> |

COMMUNICATION INTERFACE UNIT, CONNECTION TOOL FOR TEST, WRAP TEST TOOL, AND WRAP TESTING METHOD

FIELD OF THE INVENTION

The present invention relates to a communication interface unit, a connection tool, a wrap tool, and a wrap testing method, more particularly to a communication interface unit provided with such a communication interface as SCSI, RS232C, etc. used for a computer, as well as a connection tool, a wrap tool, and a wrap testing method for testing the communication interface unit respectively.

BACKGROUND OF THE INVENTION

Various types of communication interfaces have been put into practical use so as to exchange information with peripheral devices for expanding the functions of computers. SCSI (Small Computer System Interface) is one of such well-known interfaces. The use of such a SCSI interface enables a plurality of such peripheral devices as a hard disk drive, a printer, etc. to be connected to a computer in a so-called daisy-chain connection manner.

A device that uses such a communication interface as the SCSI, etc. (hereafter, to be referred to as a communication interface unit. Especially, a device that uses the SCSI is referred to as a SCSI device) must be checked beforehand for the operation and connections of signal lines. For example, a wrap test is conducted for the object SCSI device by entering an input signal and outputting an output signal separately. Concretely, in the case of such a wrap test, an output signal from the SCSI device is wrapped to the SCSI device as an input signal as is.

In such a wrap test that tests the operation and connections of signal lines of the object SCSI device, a connection tool referred to as a wrap tool is employed. In this wrap tool, each terminal is shorted with another so as to wrap mainly a SCSI input signal as an output signal as is. Such a testing technique is disclosed in Published Unexamined Patent Application No. 5-73445. The technique checks connections of SCSI signal lines for normal or abnormal. The wrap tool is composed simply as described above, so the outside configuration of the wrap tool is similar to that of a terminal connector, that is, the so-called SCSI terminator attached to the end of the daisy-chained SCSI devices.

However, because of the similarity of the outside configuration between the wrap tool and the SCSI terminator, problems often occur in wrap tests for SCSI devices with use of this wrap tool; a SCSI terminator is often taken instead of a wrap tool by mistake, so that the test result becomes wrong or this wrap tool is left at the SCSI device even after the wrap test, thereby causing the SCSI device to malfunction.

In order to solve this problem, there is a technique proposed for checking two SCSI control printed board unit connectors connected to each other via cable in a SCSI device (refer to Published Unexamined Patent Application No. 63-229550). This technique checks exchanges of signals between two SCSI control printed board units in which each SCSI terminal is connected to another, thereby enabling those two SCSI control printed board units to be tested.

If a wrap test is conducted as conventionally for two SCSI device connectors connected to each other via a cable, that is, each terminal is connected to another between those two SCSI connectors used as a wrap tool, however, two SCSI devices are required. It is impossible to test only one of the SCSI devices in this case.

Generally, a SCSI device is often provided with two connectors so as to enable data exchanges with external devices connected to each other in a daisy-chain manner as described above. These two connectors are connected to common signal lines from a SCSI controller provided in the SCSI device. Consequently, the above-mentioned wrap test must be conducted for all the connectors of the SCSI device.

In this case, although a wrap test is possible with use of a conventional wrap tool formed by connecting the terminals to each other between SCSI connectors via a cable, a problem arises; the object SCSI device is determined to be normal in a wrap test conducted only at one connector in some cases with use of a wrap tool whose outside configuration is similar to that of the SCSI terminator. In such a case, another problem might also arise; the wrap tool is left at the SCSI device by mistake even after the wrap test, thereby causing the SCSI device to malfunction in the started-up operation.

Under such circumstances, it is an object of the present invention to provide a communication interface unit, a connection tool, a wrap tool, and a wrap testing method that can test the operation of the communication interface unit used for a computer in a simple configuration respectively.

SUMMARY OF THE INVENTION

The communication interface unit of the present invention includes controlling means for controlling a plurality of I/O signals, thereby controlling the object communication interface unit. A plurality of the I/O signals include an acknowledge signal so as to test the operation and connections of the signal lines of the communication interface unit used for a computer. The controlling means outputs this acknowledge signal and receives the output acknowledge signal, thereby detecting the acknowledge signal. The acknowledge signal may be a constant voltage supply power from a power supply unit. In this case, the acknowledge signal can be detected by checking whether or not the input side reaches a constant voltage level.

Furthermore, the communication interface unit includes separating means and a plurality of relaying means. Separating means is provided with a plurality of signal lines for transferring a plurality of I/O signals of the controlling means. An output signal line for outputting the acknowledge signal and an acknowledge signal line for receiving the acknowledge signal, that is, the acknowledge signal line for letting the controlling means detect the acknowledge signal are also included in those I/O signal lines. Each of those signal lines is further separated into a plurality of signal lines, thereby forming a plurality of signal line groups corresponding to a plurality of I/O signal groups of the controlling means. Potential dropping means is added to each of the separated acknowledge signal lines. Each potential dropping means has resistors, which may be connected serially at middle points of the acknowledge signal line. And, such relaying means as a connector or the like is connected to each of the signal line groups of the separating means so as to relay signals to an external device.

The acknowledge signal is transferred through each of the output signal lines separated by separating means. In a wrap test, this acknowledge signal is output, then wrapped as an input signal. Concretely, the acknowledge signal is wrapped and transferred through each of the acknowledge signal lines. As described above, because potential dropping means is added to each acknowledge signal line, the potential of the acknowledge signal drops. Each signal line, separated by separating means, comes to have a connection point. Consequently, two relaying means are composed so that an output signal line of one relaying means is connected to an acknowledge signal line of the other relaying means and an acknowledge signal line of one relaying means is connected to an output signal line of the other relaying means. Concretely, an acknowledge signal line and an output signal line are connected mutually and this state is equivalent to a parallel connection of the potential dropping means. The potential is thus stabilized in correspondence to the number of added potential dropping means. This is why it can be determined whether or not the object connection is done for a wrap test by determining whether or not the object potential is stabilized in accordance with the number of added potential dropping means. And, if a wrap tool whose outside configuration is similar to that of the SCSI terminator is used for a wrap test of a SCSI device, wrong wrap tests can be prevented. This is because only one of potential dropping means is operated so that the remaining potential dropping means are excluded from the test.

The potential dropping means may be an element such as a resistor or the like for dropping the potential of the signal or for raising the potential. In other words, the potential dropping means may be any one that can stabilize the potential in accordance with the number of added potential dropping means.

The connection tool of the present invention used for wrap tests is connected to at least two relaying means included in the above communication interface unit. This connection tool is provided with connecting means for connecting a first terminal to be connected to an input signal line of the first signal line group separated by the separating means and a second terminal to be connected to an output signal line of the second signal line group. Consequently, as described above, two relaying means are composed so that an output signal line of one relaying means is connected to an acknowledge signal line of the other relaying means and an acknowledge signal line of one relaying means is connected to an output signal line of the other relaying means. Potential dropping means are thus connected in parallel. Consequently, it can be determined whether or not a connection is done for a wrap test by determining whether or not it is detected that the potential of the object acknowledge signal is stabilized in accordance with the number of added potential dropping means.

The above connecting means should preferably be connected to a plurality of relaying means provided in the communication interface unit. To meet this requirement, therefore, the first connecting means including the first terminal and to be connected to the first relaying means connected to an input signal line of the first signal line group and the second connecting means including the second terminal and to be connected to the second relaying means connected to an output signal line of the second signal line group are formed independently of each other. The first connecting means and the second connecting means formed as described above respectively are relayed mutually via a connection cable. This makes it easier, for example, to determine a difference between two devices connected to a connection cable whose both ends are connected to a connector respectively so as to be distinguished from a SCSI terminator in physical outside configuration. It is thus avoided to use a wrap tool whose outside configuration is similar to that of the SCSI terminator.

In the above case, potential dropping means is added to each of the acknowledge signal lines separated by separating means provided in the communication interface unit. However, the potential dropping means, which is requested only to drop the potential of the corresponding acknowledge signal, may be provided outside the communication interface unit. The connection tool of the present invention is therefore provided with controlling means for outputting an acknowledge signal and receiving the acknowledge signal so as to test the operation of the communication interface unit used for a computer and controlling a plurality of I/O signals including the acknowledge signal, thereby controlling the communication interface unit; separating means provided with a plurality of signal lines for transferring a plurality of the I/O signals of the controlling means, a plurality of the signal lines including an output signal line for outputting the acknowledge signal and an acknowledge signal line for receiving the acknowledge signal, the separating means being used for separating each of a plurality of the signal lines into a plurality of signal lines, thereby forming a plurality of signal line groups corresponding to a plurality of I/O signals of the controlling means; and a plurality of relaying means for relaying each of the signal line groups of separating means to an external device. Consequently, the connection tool of the present invention for testing the communication interface unit is only needed to add the following connection tool. Concretely, the connection tool is provided with a first connector attached to one of the two relaying means and provided with a first terminal to be connected to an input signal line of the first signal line group separated by the separating means and a second connector attached to the other relaying means and provided with a second terminal to be connected to an output signal line of the second signal line group, as well as a specific connecting means for connecting the first terminal of the first connector to the second terminal of the second connector with potential dropping means therebetween.

Furthermore, the wrap tool of the present invention used for testing the above communication interface unit comprises controlling means for outputting an acknowledge signal and receiving the acknowledge signal so as to test the operation of the communication interface unit used for a computer and controlling a plurality of I/O signals including the acknowledge signal, thereby controlling the communication interface unit; separating means provided with a plurality of signal lines for transferring a plurality of the I/O signals of the controlling means, a plurality of the signals including an output signal line for outputting the acknowledge signal and an acknowledge signal line for receiving the acknowledge signal and separating each of the signal lines into a plurality of signal lines, thereby forming a plurality of signal line groups corresponding to the I/O signals of the controlling means; potential dropping means being added to each of the separated acknowledge signal lines; a plurality of relaying means for relaying each of the signal line groups of separating means to an external device; and connecting means for connecting the first terminal to be connected to an input signal line of the first signal line group separated by the separating means and the second terminal to be connected to an output signal line of the said second signal line group to at least two of the relaying means serially.

This connecting means forms the first connecting means including the first terminal and to be connected to the first relaying means connected to an input signal line of the first signal line group and the second connecting means including the second terminal and to be connected to the second relaying means connected to an output signal line of the second signal line group independently of each other. The connecting means is provided with a connection cable for relaying the formed first connecting means to the formed second connecting means.

The wrap testing method of the present invention for the above communication interface unit comprises the step of outputting an acknowledge signal and receiving the acknowledge signal so as to test the operation of the communication interface unit used for a computer and controlling a plurality of I/O signals including the acknowledge signal, thereby controlling the communication interface unit; separating each of signal lines for transferring a plurality of the I/O signals, a plurality of the signal lines including an output signal line for outputting the acknowledge signal and an acknowledge signal line for receiving the acknowledge signal into a plurality of signal lines, thereby forming a plurality of signal line groups; connecting the acknowledge signal transferred through an input signal line of the separated first signal line group to an acknowledge signal line of the second signal line group; and dropping the potential of each acknowledge signal transferred through the acknowledge signal line so as to achieve the object of the present invention.

BRIEF DESCRIPTION OF THE DRAWINGS

The invention will now be described with specific reference to the appended figures wherein.

DETAILED DESCRIPTION OF THE INVENTION

Figure 2:
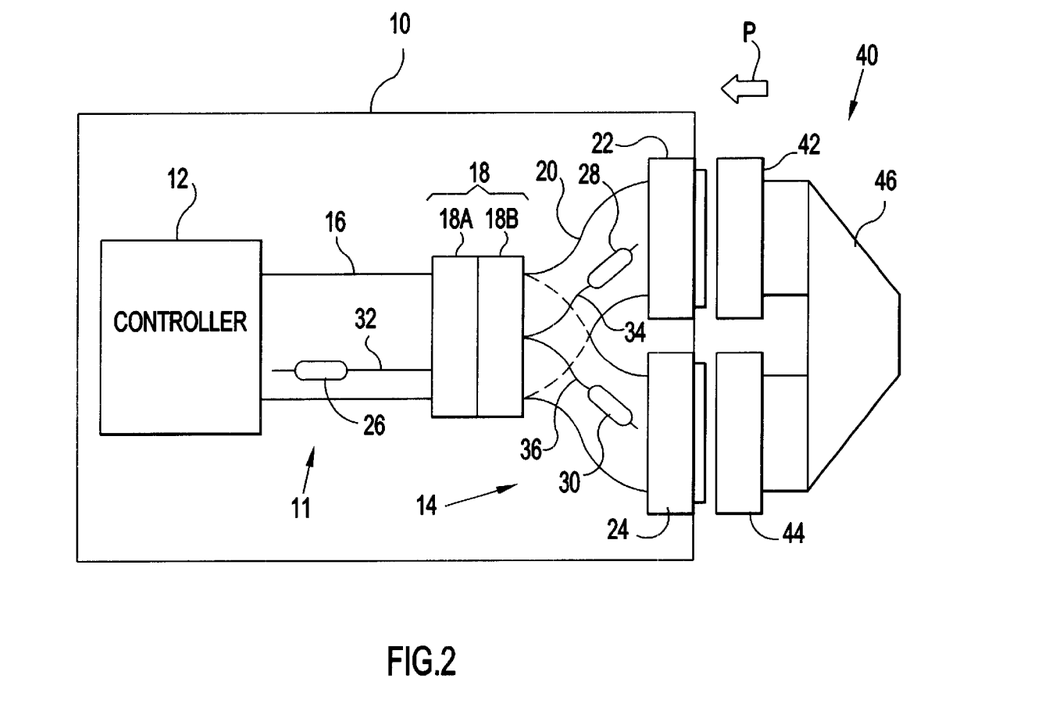
FIG. 2 is a schematic block diagram of both SCSI device and wrap tool in the embodiment of the present invention.

FIG. 2 is an explanatory view and a schematic block diagram of a communication interface unit in the preferred embodiment of the present invention. In this embodiment, the communication interface unit is a SCSI device to be used favorably for such a hardware unit as a personal computer, etc.

The SCSI device 10, which employs SCSI for its communication interface, is provided with a SCSI controller 12 composed so as to include a microcomputer for controlling data exchanges. The SCSI controller 12 is provided with a straight cable 16 having an internal connector 18A. This straight cable 16 transfers I/O signals of the SCSI controller 12. Consequently, the I/O signals of the SCSI controller 12 are also transferred to the internal connector 18A. This internal connector 18A, the straight cable 16, and the SCSI controller 12 are combined to compose a SCSI device body 11 used to input/output SCSI signals.

The SCSI device 10 is also provided with two SCSI connectors 22 and 24 so as to exchange signals with external devices. The SCSI connectors 22 and 24 are fixed to the SCSI device case. A branch cable 20 is connected to each of those SCSI connectors 22 and 24. One end of the branch cable 20 is connected to the internal connector 18B to be connected to the internal connector 18A. On the other hand, the other end of the branch cable 20 is connected to the SCSI connectors 22 and 24. Each signal line of the branch cables 20 from the SCSI connectors 22 and 24 is connected to the internal connector 18B. Consequently, the pins assignment of the internal connector 18B is the same as that of the SCSI connectors 22 and 24. And, signals of the internal connector 18B correspond to the pin positions (pins assignment), which are common to the SCSI connectors 22 and 24.

The internal connectors 18A and 18B are connected mutually to compose an internal connector 18, so the SCSI controller 12 can exchange signals with devices outside the SCSI device 10 via the SCSI connectors 22 and 24. The internal connector 18B, the branch cable 20, and the SCSI connectors 22 and 24 are combined to compose a Y-type cable 14 that enables the same two signals to be exchanged with the SCSI controller 12.

Figure 1:
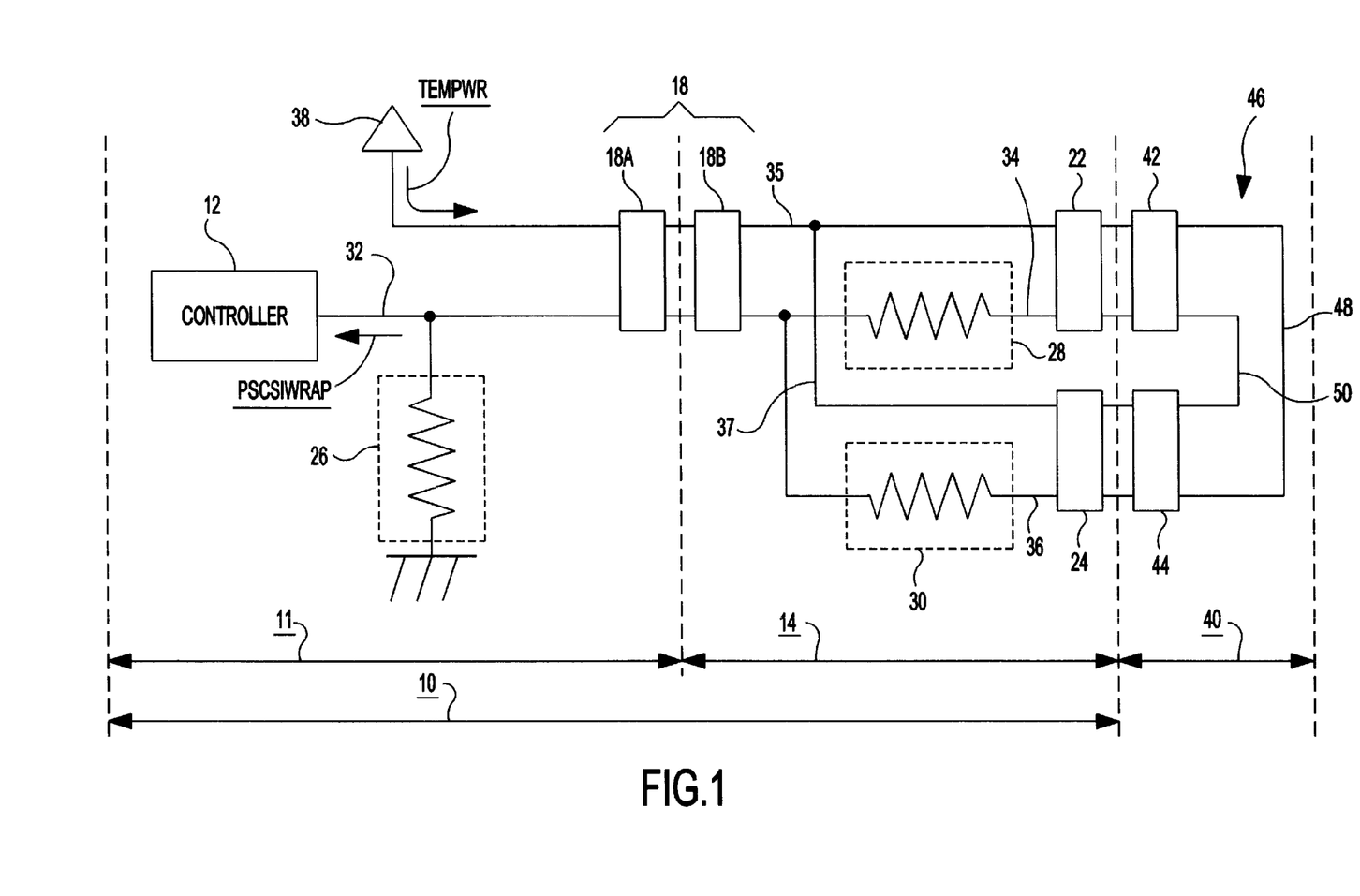
FIG. 1 is a schematic block diagram of the connections between a SCSI device and a wrap tool in the embodiment of the present invention.

In this embodiment, a resistor is added to each signal line inside the SCSI device 10. The details of such a resistor will be described later (FIG. 1). A resistor 26 whose one end is grounded is connected to a signal line 32 of the straight cable 16, used for a wrap test. Resistors 28 and 30 are added to the signal lines 34 and 36 of the branch cable 20, used for a wrap test respectively.

The SCSI controller 12 is provided with a memory (not illustrated) for storing a wrap test program. The wrap test program is executed according to commands entered by the operator and/or signals entered from external devices.

The above SCSI controller 12 is equivalent to the controlling means of the present invention. The branch cable 20 or the Y-type cable 14 is equivalent to separating means of the present invention. The SCSI connectors 22 and 24 are equivalent to a plurality of relaying means of the present invention.

To conduct a wrap test for the SCSI device 10, a tool is connected to the SCSI device 10. The tool is a wrap tool 40. The wrap tool 40 is composed of connection connectors 42 and 44 connected to both sides of a relay cable 46. The connection connector 42 is connected to a SCSI connector 22 (in the direction of the arrow P shown in FIG. 2) and the connection connector 44 is connected to a SCSI connector 24 before a SCSI wrap test is conducted. In this embodiment, a wrap tool whose outside configuration is similar to that of a SCSI terminator is not used, but a connection cable is used. Both ends of the connection cable are connected to a connector respectively so as to be distinguished in physical outside configuration from the SCSI terminator. The wrap tool 40 should preferably use a relay cable 46 of 30 cm or less in length so as to avoid confusion with a general SCSI cable. This is because the length of the SCSI cable is specified to be 30 cm or more in ANSI.

Figure 3:
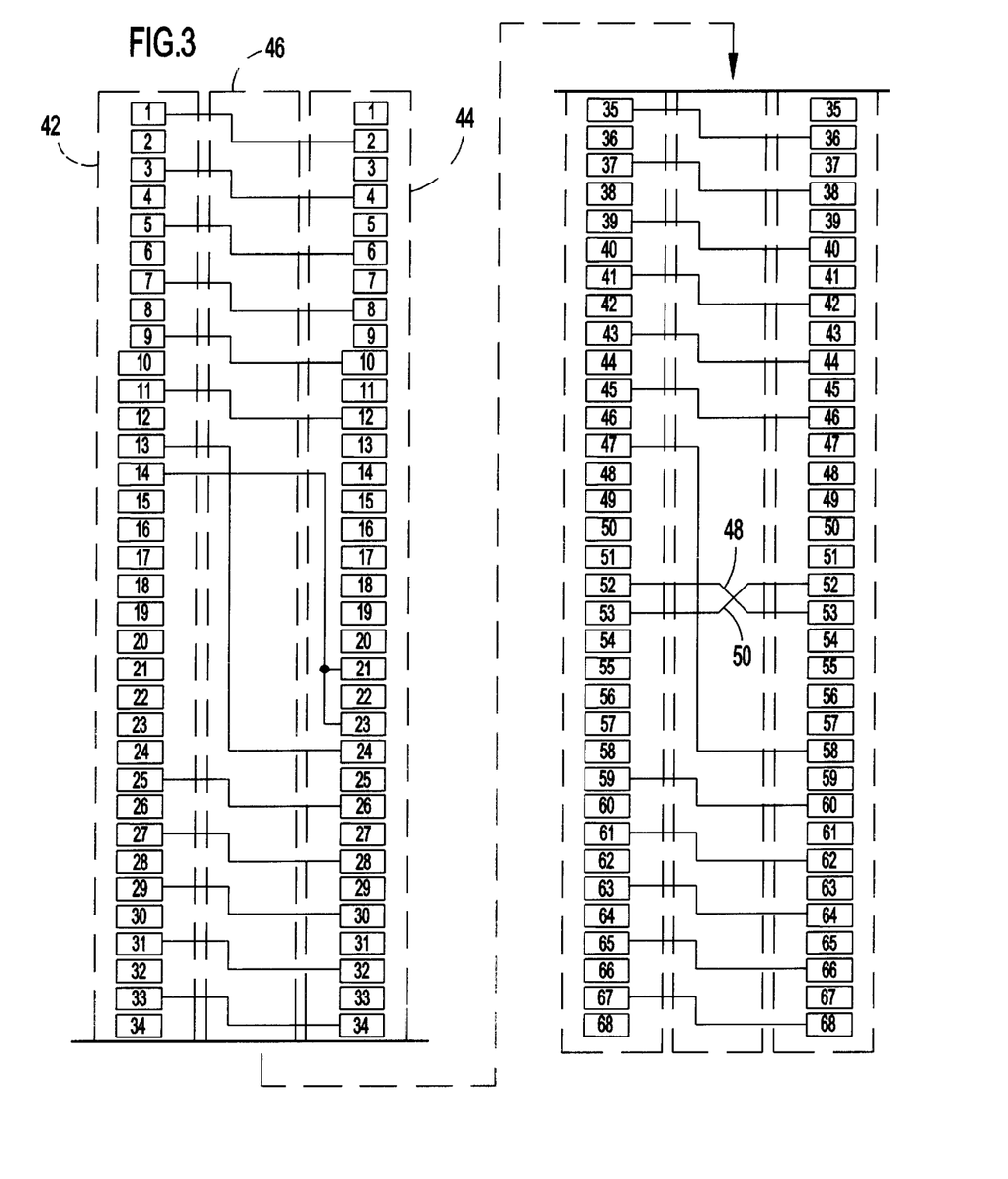
FIG. 3 is a schematic block diagram of the connections of the wrap tool in the embodiment of the present invention.
Figure 4:
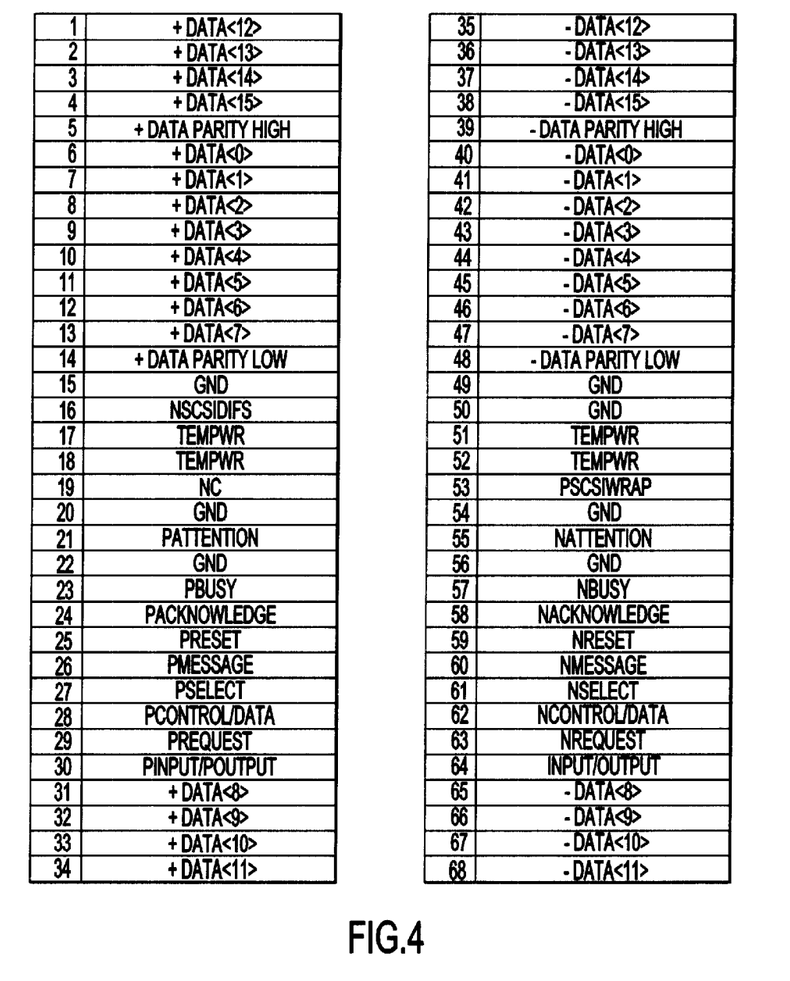
FIG. 4 shows the correspondence between signal pins and signal names of the wrap tool in the embodiment of the present invention.

FIG. 3 shows the relationship of the wrap tool 40 with the connectors 42 and 44 and the relay cable 46. In FIG. 3, values shown inside the square frames denote assigned connector pins. FIG. 4 shows the signal name of each of those pins.

In order to compose the SCSI device 10, many more electrical circuits, etc. are needed in addition to those shown in FIGS. 1 and 2. Those circuits and items are already known and they are not the substance of the present invention. The description thereof will therefore be omitted here. In addition, only some of the connections among hardware blocks are illustrated in FIG. 3 so as to simplify the description. However, the connections necessary for conducting the SCSI wrap test with use of a wrap tool 40 for the SCSI device 10 of the present invention are described below.

FIG. 1 shows a block diagram of connections for the SCSI device 10 of the present invention so as to start a SCSI wrap test with use of the wrap tool 40.

The signal line 32 from the SCSI controller 12 is connected to one end of the resistor 26 whose other end is grounded. This signal line 32 is connected to the branch cable 20 via an internal connector 18. The signal line 32 is then connected to the signal line 34 at the SCSI connector 22 side and the signal line 36 at the SCSI connector 24 side respectively. A resistor 28 is connected between the internal connector 18B of the signal line 34 and the SCSI connector 22 and a resistor 30 is connected between the internal connector 18B of the signal line 36 and the SCSI connector 24. In addition, an output device 38 for outputting a signal (TEMPWR) used to recognize the wrap tool 40 is connected to the branch cable 20 via the internal connector 18. The output device 38 is further connected to the signal line 35 at the SCSI connector 22 side and the signal line 37 at the SCSI connector 24 side respectively.

The signal (TEMPWR) output from the output device 38 and used to recognize the wrap tool 40 is equivalent to an acknowledge signal transferred through an output signal line of the present invention.

The signal line 35 of the branch cable 20 at the SCSI connector 22 side is connected to the signal line 48 via the SCSI connector 22 and the connection connector 42. This signal line 48 is connected to the signal line 36 via the connection connector 44 and the SCSI connector 24. On the other hand, the signal line 37 of the branch cable 20 at the SCSI connector 24 side is connected to the signal line 50 via the SCSI connector 24 and the connection connector 44. This signal line 50 is connected to the signal line 34 via the connection connector 42 and the SCSI connector 22. Consequently, if the wrap tool 40 is connected to the SCSI device 10, the signal (TEMPWR) used to recognize the wrap tool 40 is output to the SCSI connectors 22 and 24 via the branch cable 20, then returned to the signal lines 36 and 34 via the other SCSI connector in the wrap tool 40. Concretely, because the wrap tool 40 is connected to the SCSI device 10, the signal lines 34 and 37, as well as 36 and 35 are set into conduction respectively.

The above wrap tool 40 is equivalent to connecting means of the present invention. Resistors 28 and 30 are equivalent to the potential dropping means of the present invention. In this embodiment, because a resistor 26 is connected to a signal line so as to stabilize the potential of the acknowledge signal, the resistor 26 is used to compose part of the potential dropping means of the present invention in some cases. The signal lines collected in the SCSI connector 22 are equivalent to those of the first signal line group separated by separating means of the present invention and the signal lines collected in the SCSI connector 24 are equivalent to those of the second signal line group. The input signal lines of the first signal line group are equivalent to the signal lines 35 and 37 and the output signal lines of the second signal line group are equivalent to signal lines 34 and 36. In addition, the first terminal to be connected to an input signal line is equivalent to a pin of the connection connector 42 corresponding to the 52nd pin of the SCSI connector. The second terminal is equivalent to a pin of the connection connector 44 corresponding to the 53rd pin of the SCSI connector. The first connecting means of the present invention is equivalent to the connection connector 42 and the second connecting means is equivalent to the connection connector 44. The connection cable is equivalent to the relay cable 46.

In this embodiment, a power supply unit that can supply a constant voltage is employed as the output device 38. This output device 38 may be provided inside the SCSI controller 12.

Next, a description will be made in detail of a SCSI wrap test conducted for the SCSI device 10 with use of the wrap tool 40. This SCSI wrap test is conducted to test the connection between the SCSI controller 12 and the SCSI connectors 22 and 24, as well as the operation of the SCSI controller 12 by shutting down signal exchanges of the SCSI device 10 with other devices.

Figure 5:
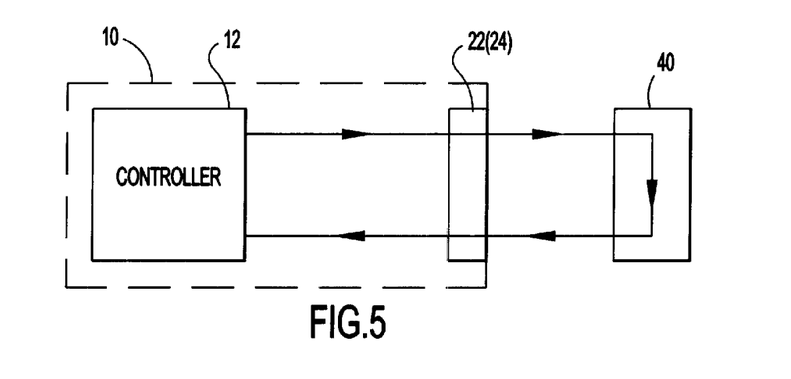
FIG. 5 shows how a SCSI wrap test is conducted for the SCSI device with use of a wrap tool in the embodiment of the present invention.

As shown in FIG. 5, the connection connector 42 is connected to the SCSI connector 22 and the connection connector 44 is connected to the SCSI connector 24. In the wrap tool 40, input and output signals are corresponded to different signal terminals. Consequently, signals output from the SCSI controller 12 are replaced with other signals inside the wrap tool 40, then wrapped to the SCSI controller 12. At this time, it is determined whether or not the state of each wrapped signal matches with that of the output signal, thereby checking the line connections and testing the operation of the SCSI controller 12.

Figure 9:
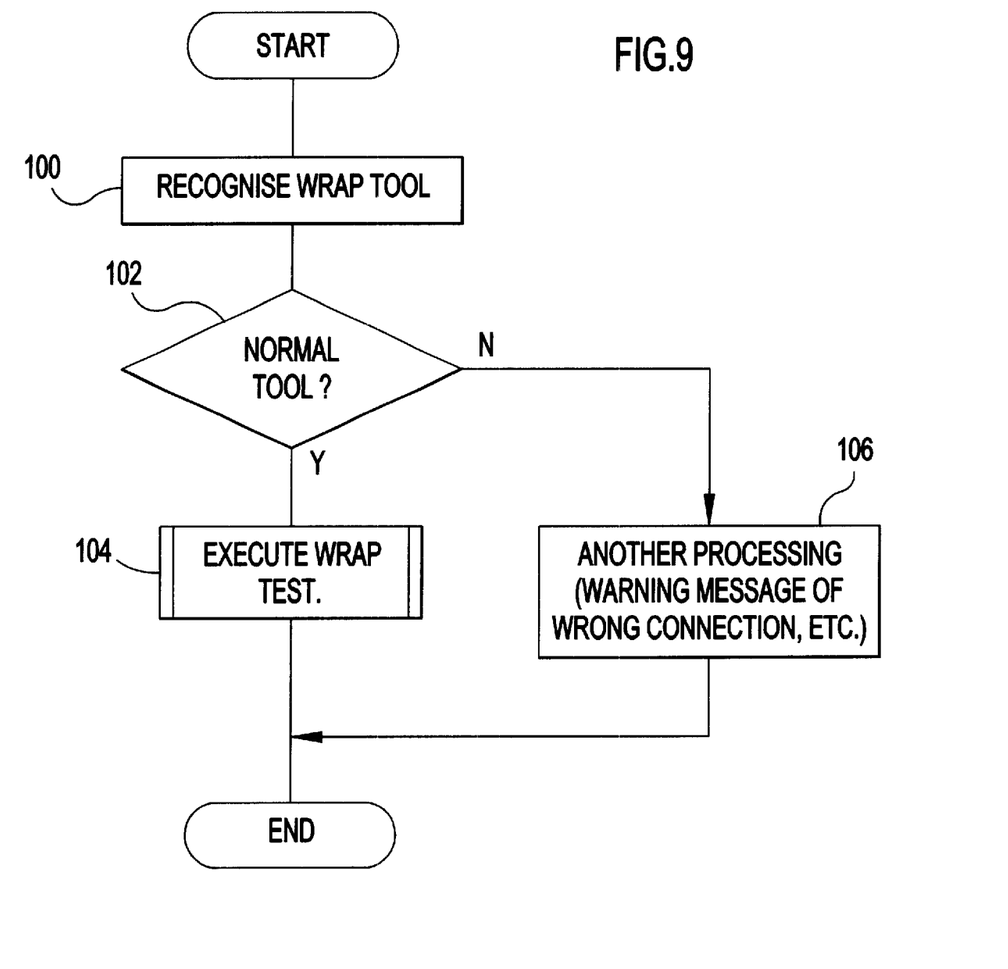
FIG. 9 is a flow chart for a SCSI wrap test processing.

In this embodiment, the wrap test program shown in FIG. 9 is executed as follows in the SCSI controller 12 in response to a command from the operator and/or a signal input from an external device. At first, the wrap tool connected to the SCSI device 10 is recognized in step 100. Then, it is determined whether or not the connected wrap tool is a normal one from the recognition result in the next step 102. If the wrap tool 40 is a normal one, it is acknowledged in step 102, then each pin is checked in the next step 104. After that, this wrap test routine is ended. On the other hand, if it is negated in step 102, it means that another device is connected to the SCSI device 10. Another processing is thus conducted in step 106. This "another processing" is, for example, warning of wrong connection (denoted by a sound or light). This routine may be ended without conducting the processing in step 106.

Figure 6:
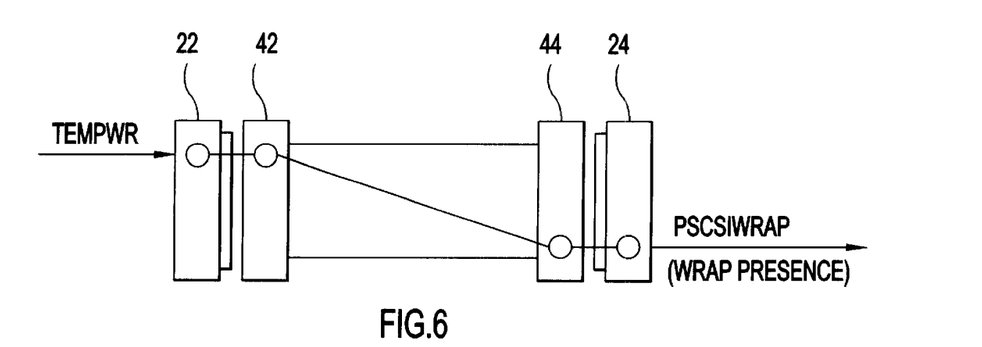
FIG. 6 shows the relationship between the signals for recognizing the wrap tool in the embodiment of the present invention.
Figure 7:
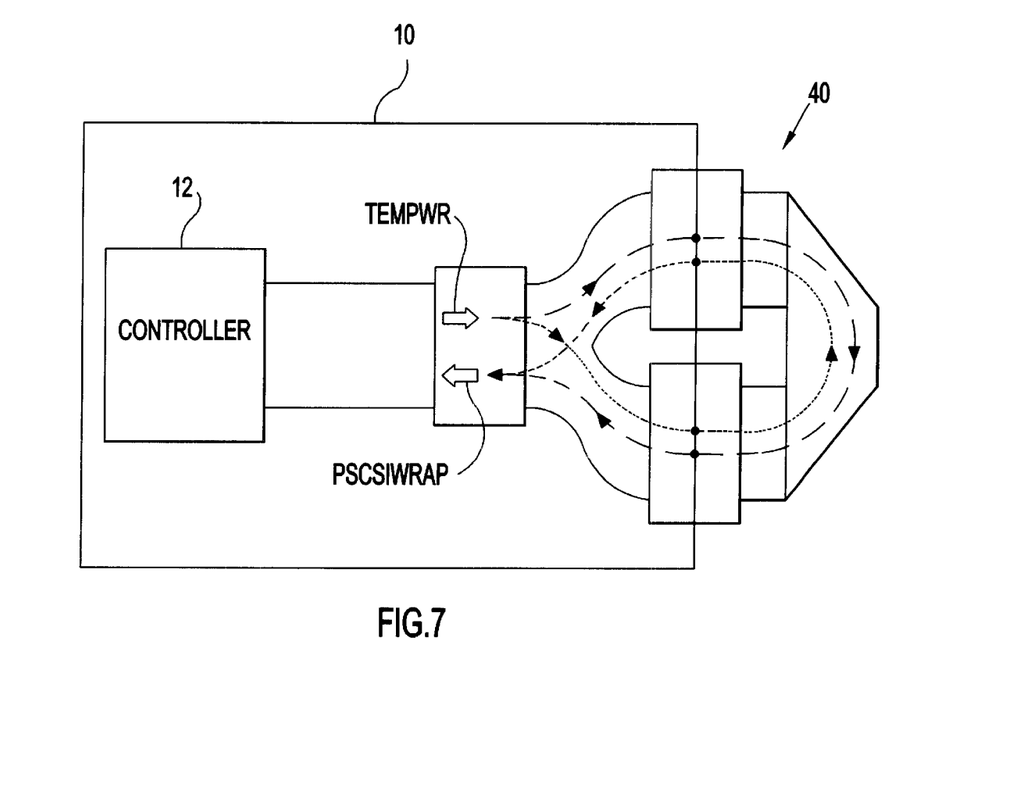
FIG. 7 shows a signal flow in both SCSI device and wrap tool for recognizing the wrap tool in the embodiment of the present invention.

As described above, the wrap tool 40 is recognized (step 100) before the SCSI wrap test is conducted in this embodiment. This is to improve the wrap test accuracy and avoid troubles to be caused by wrong line connection. This recognition is conducted, as shown in FIGS. 6 and 7, by outputting a signal (TEMPWR) for recognizing the wrap tool 40, then recognizing the state of the signal (PSCSIWRAP) wrapped by the wrap tool 40 in the SCSI controller 12. If the state is agreed between this wrapped signal and the output signal (to be described in detail later), the tool is determined to be a normal one. In this embodiment, the signal (TEMPWR) corresponds to the 52nd pin of the SCSI connector and the signal (PSCSIWRAP) corresponds to the 53rd pin. Consequently, the 52nd pin and the 53rd pin are crossed so that the output signal is returned to the corresponding pin in the wrap tool 40 (FIG. 3).

Consequently, it is determined in step 102 whether or not the state of this wrapped signal (PSCSIWRAP) corresponds to that of the output signal (TEMPWR), thereby checking the line connections and testing the operation of the SCSI controller 12. At this time, resistors 26, 28, and 30 are connected to the signal lines 32, 34, and 36 for transferring the output signal (TEMPWR), that is, the straight cable 16 and the branch cable 20 in the SCSI device 10 respectively.

Figure 8:
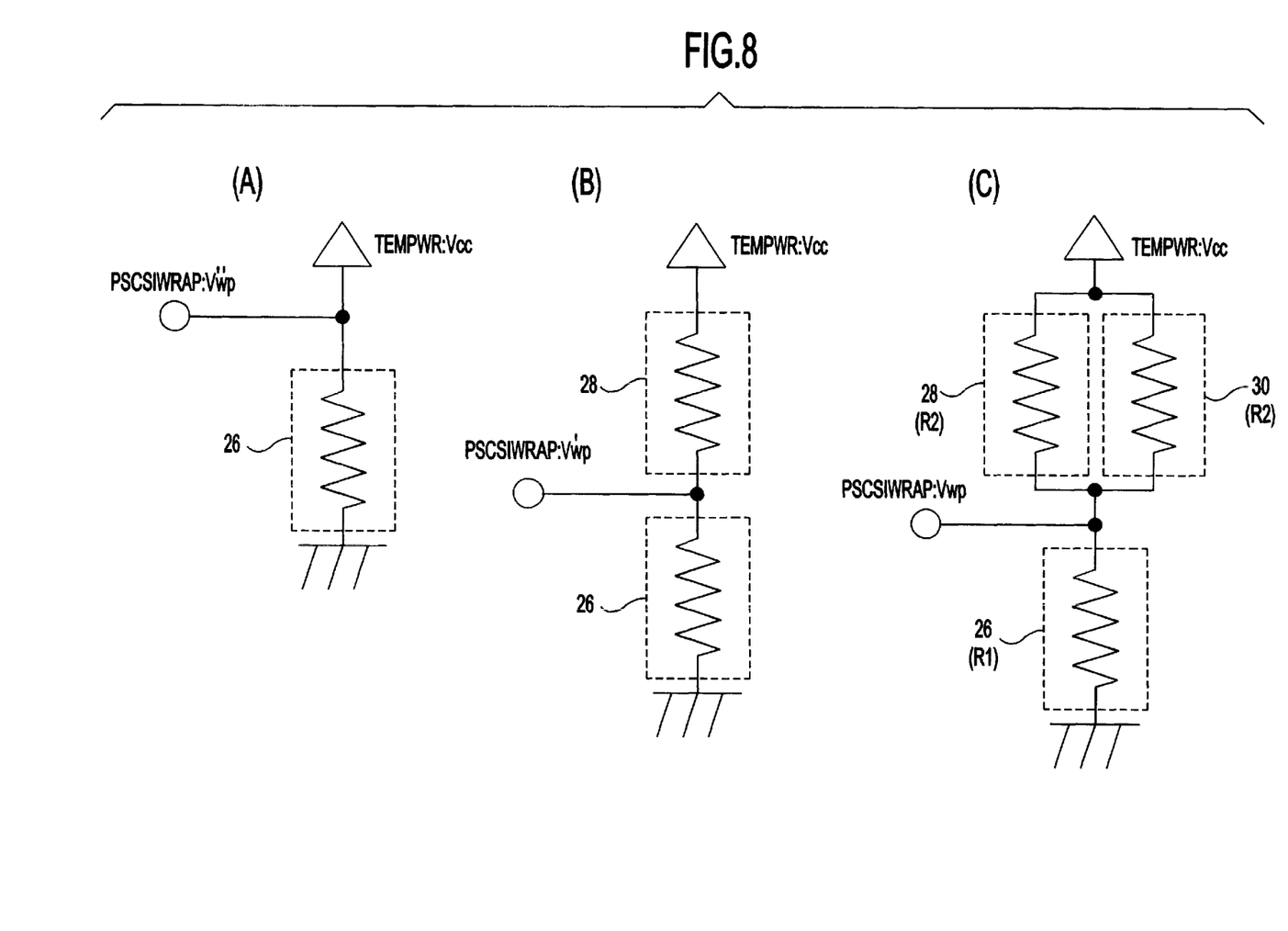
FIG. 8 is an equivalent circuit related to the wrapped signal (PSCSIWRAP) when a wrap tool is connected to the SCSI device in the embodiment of the present invention.

While the wrap tool 40 in this embodiment is connected to the SCSI device 10, the signal lines 34 and 37, as well as the signal lines 35 and 36 are set into conduction respectively. Consequently, as shown in FIG. 8(C), the state between the output device 38 for outputting the signal (TEMPWR) and the SCSI controller 12 becomes equivalent to a parallel connection of the resistors 28 and 30. At this time, if it is assumed that the resistance value of the resistor 26 is R1, the resistance values of the resistors 28 and 30 are R2, the potential level of the output signal (TEMPWR) is Vcc, and the potential level of the wrapped signal (PSCSIWRAP) is Vwp, then the relationship in the following Equation (1) is satisfied.

$$Vwp = \{R1/(R1+R2/2)\} \cdot Vcc \tag{1}$$

Consequently, if the minimum potential level that can detect the wrapped signal (PSCSIWRAP) is Vth, the relationship in the following Equation (2) is required, that is, the potential level Vwp of the wrapped signal (PSCSIWRAP) must be set to the minimum potential level Vth or over.

$$Vwp \geq Vth \tag{2}$$

Generally, the potential level Vcc of the output signal (TEMPWR) is often fixed. It is thus only required to fix the resistance values of the resistors 28 and 30 so as to satisfy the relationship in the above Equation (2) at this time. If the resistance value of the resistor 26 added to the straight cable 16 of the SCSI controller 12, as well as the potential level Vcc and the minimum potential level Vth are all already fixed, then the allowable range of the resistance values R2 of the resistors 28 and 30 are as shown in the following Equation (3).

$$R1 \cdot \{(Vcc/Vth)-1\} \leq R2 \leq R2 \cdot R1\{(Vcc/Vth)-1\} \tag{3}$$

Consequently, it is possible to determine the validity of the wrap tool 40 in step 102 only by determining whether or not the wrapped signal (PSCSIWRAP) over the minimum potential level Vth is detected.

In some cases, a conventional wrap tool, that is, a wrap tool having one connection connector that is similar to the SCSI terminator in outside configuration is employed by mistake for the SCSI device 10 in this embodiment. Next, such a case will be described. The SCSI device 10 in this embodiment is provided with two SCSI connectors 22 and 24. And, if a SCSI device is connected to any one of those SCSI connectors 22 and 24, the state becomes equivalent to a connection of one of the resistors 28 and 30 between the output device 38 for outputting the signal (TEMPWR) and the SCSI controller 12 as shown in FIG. 8(B). Consequently, the relationship in the following Equation (4) is satisfied between the potential level Vcc of the output signal (TEMPWR) and the potential level V'wp of the wrapped signal (PSCSIWRAP).

$$V'wp = \{R1/(R1+R2)\} \cdot Vcc \tag{4}$$

The connection shown in FIG. 8(B) is a wrong connection. To avoid such a wrong connection, therefore, the potential level V'wp is set to the minimum potential level Vth or under (refer to the Equation (5)) as described above.

$$V'wp < Vth \tag{5}$$

Consequently, if each value is set so as to satisfy the above Equations (1) to (5), it is possible to remove using a wrong wrap tool, that is, possible to negate that the wrap tool is a normal one even when a wrap tool having only one connection connector whose outside configuration is similar to that of the SCSI terminator is employed by mistake.

If a wrap test is to be conducted by connecting a conventional wrap tool, that is, a wrap tool having only one connection connector, which is similar to the SCSI terminator in outside configuration, to the internal connector 18 provided inside the SCSI device 10 in this embodiment, then the state becomes equivalent to a short-circuit between the output device 38 for outputting the signal (TEMPWR) and the SCSI controller 12 as shown in FIG. 8(A). Consequently, the relationship in the following Equation (6) is satisfied between the potential level Vcc of the output signal (TEMPWR) and the potential level V"wp of the wrapped signal (PSCSIWRAP).

$$V''wp = Vcc \tag{6}$$

In the case of the connection state shown in FIG. 8(A), because the potential level V"wp is over the above minimum potential level Vth, a wrap test can be conducted. In this case, the SCSI device 10 is separated from other SCSI devices surely. When the SCSI device 10 is used actually, the original connections must be restored. Malfunctions and other troubles can thus be avoided. Consequently, an ordinary wrap test can be conducted in this case.

Because a resistor is added to the route inside the SCSI device 10, in which a wrapped signal (PSCSIWRAP) of the signal (TEMPWR) used to recognize the wrap tool 40 is transferred in this embodiment, the wrapped signal can be detected only when a normal wrap tool is connected to the SCSI device 10. Consequently, the SCSI wrap test can be conducted for the SCSI device 10 so as to become free of malfunctions and other wrong determinations to be caused by connection of a wrong wrap tool.

Furthermore, because the wrap tool used for the SCSI wrap test in this embodiment is composed of a connection cable obtained by connecting a connector to both sides thereof so as to be distinguished in physical outside configuration from the conventional wrap tool, that is, a relay cable 46 whose both ends are connected to the connection connectors 42 and 44 respectively, the wrap tool can be apparently distinguished from the conventional wrap tool that is similar to the SCSI terminator in outside configuration, thereby avoiding wrong use of such a conventional wrap tool. In addition, the length of the relay cable 46 of the wrap tool 40 can be changed, so it is possible to avoid confusion with a general SCSI cable, thereby the wrap tool 40 can be distinguished apparently from the SCSI cable.

Furthermore, because the SCSI device 10 is connected to a wrap tool that uses a connection cable whose both ends are connected to a connector respectively, the two SCSI connectors in a general SCSI device can be separated completely from other SCSI devices, so that a wrap test can be conducted only for the object SCSI device. It is thus possible to minimize such man-made troubles as wrong operations by the operator, etc.

Although a SCSI wrap test is conducted after the wrap tool 40 is recognized with use of a specific signal line in this embodiment, the present invention is not limited only to the embodiment; such potential dropping means as a resistor or the like may be added to every signal line so that the potential level is determined when a test is conducted for each signal line or such potential dropping means as a resistor or the like may be added to a predetermined signal line so that the potential is determined when a test is conducted for the signal line.

Furthermore, although a resistor, which is potential dropping means, is added inside the object SCSI device in this embodiment, the present invention is not limited only to the embodiment; the resistor may be added to each signal line of the wrap tool. In such a case, the first connector of the present invention is equivalent to the connection connector 42 of the wrap tool and the second connector is equivalent to the connection connector 44. Although the present invention is applied to a SCSI device, which is employed as the communication interface unit in this embodiment, the present invention is not limited only to the embodiment; the present invention may apply to another communication interface for which such a test as a wrap test, etc. is conducted to the device itself. "Another communication interface" may be any of the interfaces specified for RS232C and RS422, as well as parallel interfaces. This completes the description of the present invention on the basis of a specific embodiment, but the present invention also includes many other embodiments that can be expected easily by taking the concept of the present invention into consideration.

As described above, according to the present invention, because the potential of the acknowledge signal is dropped at each wrap test so as to test the connections of the signal lines and the operation of the object communication interface unit, it is possible to determine easily whether or not a wrap test can be conducted by checking the potential of the acknowledge signal.

Furthermore, because connecting means of the connection tool are used to connect a plurality of such relaying means as connectors, etc. so as to relay signals from the communication interface unit to an external device, it is easy to distinguish the connecting means just like, for example, a connection cable whose both ends are connected to a connector respectively so as to be distinguished in physical outside configuration from others.

Having thus described the invention, what is claimed is:

1. A communication interface unit for a computer, comprising:
    a controlling device for outputting an acknowledge signal and receiving said acknowledge signal so as to test the operation of a communication interface used for a computer, as well as controlling a plurality of I/O signals including said acknowledge signal, thereby controlling said communication interface;
    a separating device provided with a plurality of signal lines for transferring a plurality of I/O signals of said controlling device, a plurality of said signal lines including at least one output signal line for outputting said acknowledge signal and at least one acknowledge signal line for receiving said acknowledge signal, said separating device being used for separating each of a plurality of said signal lines into a plurality of signal line groups corresponding to a plurality of said I/O signals of said controlling device, a potential dropping device being added to each of a plurality of said acknowledge signal lines; and
    a plurality of relaying devices for relaying each of a plurality of said signal line groups of said separating device to an external device.

2. A connection tool for testing a communication interface unit comprising a controlling device for outputting an acknowledge signal and receiving said acknowledge signal so as to test the operation of a communication interface used for a computer, as well as controlling a plurality of I/O signals including said acknowledge signal, thereby controlling said communication interface, a separating device provided with a plurality of signal lines for transferring a plurality of I/O signals of said controlling device, a plurality of said signal lines including at least one output signal line for outputting said acknowledge signal and at least one acknowledge signal line for receiving said acknowledge signal, said separating device being used for separating each of a plurality of said signal lines into a plurality of signal line groups corresponding to a plurality of said I/O signals of said controlling device, a potential dropping device being added to each of a plurality of said acknowledge signal lines, and a plurality of relaying devices for relaying each of a plurality of said signal line groups of said separating device to an external device, said connection tool comprising:
    a connecting device for connecting a first terminal to be connected to an input signal line of a first signal line group separated by said separating device and a second terminal to be connected to an output signal line of a second signal line group separated by said separating device to at least two relaying devices included in said communication interface unit.

3. The connection tool for testing said communication interface unit according to claim 2, wherein said connecting device forms a first connecting device including said first terminal and to be connected to a first relaying device connected to an input signal line of said first signal line group and a second connecting device including said second terminal and to be connected to a second relaying device connected to an output signal line of said second signal line group independently of each other, said connecting device being provided with a connection cable for relaying said formed first connecting device to said formed second connecting device.

4. The connection tool for testing said communication interface unit, including:
    a controlling device for outputting an acknowledge signal and receiving said acknowledge signal so as to test the operation of a communication interface used for a computer and controlling a plurality of I/O signals including said acknowledge signal, thereby controlling said communication interface;
    a separating device provided with a plurality of signal lines for transferring a plurality of I/O signals of said controlling device, a plurality of said signal lines including an output signal line for outputting said acknowledge signal and an acknowledge signal line for receiving said acknowledge signal, said separating device being also used for separating each of a plurality of said signal lines into a plurality of signal lines, thereby forming a plurality of signal line groups corresponding to a plurality of said I/O signals of said controlling device; and
    a plurality of relaying devices for relaying each of a plurality of said signal groups of said separating device to an external device,
    wherein said connection tool further includes:
        a specific connecting device provided with;
            a first connector provided with a first terminal to be attached to one of said two relaying devices and connected to an input signal line of said first signal line group separated by said separating device and a second connector provided with a second terminal to be attached to the other relaying device and connected to an output signal line of said second signal line group, said specific connecting device enabling said first terminal of said first connector to be connected to said second terminal of said second connector with a potential dropping device therebetween.

5. A wrap tool for testing said communication interface unit, comprising:

a controlling device for outputting an acknowledge signal and receiving said acknowledge signal so as to test the operation of a communication interface used for a computer and controlling a plurality of I/O signals including said acknowledge signal, thereby controlling said communication interface;

a separating device provided with a plurality of signal lines for transferring a plurality of I/O signals of said controlling device respectively, a plurality of said signal lines including an output signal line for outputting said acknowledge signal and an acknowledge signal line for receiving said acknowledge signal, said separating device being also used for separating each of a plurality of said signal lines into a plurality of signal lines, thereby forming a plurality of signal line groups corresponding to a plurality of said I/O signals of said controlling device, a potential dropping device being added to each of said separated acknowledge signal lines;

a plurality of relaying devices for relaying each of a plurality of said signal line groups of said separating device to an external device; and a connecting device for connecting a first terminal to be connected to an input signal line of said first signal line group separated by said separating device and a second terminal to be connected to an output signal line of said second signal line group to at least two of said relaying devices serially.

6. The wrap tool for testing said communication interface unit according to claim 5 wherein said connecting device forms a first connecting device including said first terminal and to be connected to a first relaying device connected to an input signal line of said first signal line group and a second connecting device including said second terminal and to be connected to a second relaying device connected to an output signal line of said second signal line group independently of each other, said connecting device being provided with a connection cable for relaying said first connecting device to said second connecting device formed respectively as described above.

7. A method for testing said communication interface unit, comprising the steps of:

outputting an acknowledge signal and receiving said acknowledge signal so as to test the operation of a communication interface used for a computer and controlling a plurality of I/O signals including said acknowledge signal, thereby controlling said communication interface;

separating each of a plurality of signal lines for transferring a plurality of I/O signals into a plurality of signal lines groups, each of said signal line groups including an output signal line for outputting said acknowledge signal and an acknowledge signal line for receiving said acknowledge signal;

connecting said acknowledge signal transferred through an input signal line of said separated first signal line group to said acknowledge signal line of said second signal line group; and dropping the potential of each acknowledge signal transferred through said acknowledge signal line.

8. A program storage device readable by machine tangibly embodying a program of instructions executable by the machine for performing a method for testing a communication interface unit of a computer, said method comprising the steps of;

outputting an acknowledge signal and receiving said acknowledge signal so as to test the operation of a communication interface used for a computer and controlling a plurality of I/O signals including said acknowledge signal, thereby controlling said communication interface;

separating each of a plurality of signal lines for transferring a plurality of I/O signals into a plurality of signal lines groups, said signal line groups each comprising at least an output signal line for outputting said acknowledge signal and an acknowledge signal line for receiving said acknowledge signal;

connecting said acknowledge signal transferred through an input signal line of said separated first signal line group to said acknowledge signal line of said second signal line group; and dropping the potential of each acknowledge signal transferred through said acknowledge signal line.

* * * * *